United States Patent Office 3,739,046
Patented June 12, 1973

3,739,046
REMOVAL OF ORTHOPHOSPHATES FROM
ORGANIC PHOSPHATE ESTERS
James R. Stanford, Sugar Land, and James D. Watson,
Houston, Tex., assignors to Nalco Chemical Company,
Chicago, Ill.
No Drawing. Filed May 3, 1971, Ser. No. 139,825
Int. Cl. C07f 9/02
U.S. Cl. 260—990          5 Claims

ABSTRACT OF THE DISCLOSURE

Orthophosphates are removed from organic phosphate esters by precipitating them as inorganic phosphates at an elevated pH in a reaction medium containing a polar solvent and water in which the inorganic phosphate is insoluble.

BACKGROUND

It is known in the art to prepare organic phosphate esters by reacting polyphosphoric acid or phosphorous pentoxide or mixtures thereof with hydroxy hydrocarbons and/or hydroxyamines as disclosed, for example, in U.S. Pats. 3,462,365, 3,477,956 and 3,502,587. The resultant compositions are especially useful as scale inhibitors when added to water containing hardness components such as, for example, barium sulfate, calcium sulfate and calcium carbonate. While these organic phosphate esters are effective scale inhibitors when added to scale forming waters in hardness-ion-precipitation-preventing quantities of the order of 0.5 to 100 parts per million (p.p.m.) of the active effective compound their effectiveness is reduced in certain calcium-containing waters due to the fact that orthophosphate is one of the reaction products from the organic phosphate reaction and the presence of orthophosphate reduces the overall effectiveness due to its reaction with calcium to form calcium orthophosphate, thereby producing a scale rather than preventing scale formation.

Accordingly, it would be desirable to provide organic phosphate scale inhibitors of the type described in which the amount of orthophosphate, especially inorganic orthophosphate, is reduced to a minimum.

OBJECTS

One of the objects of the present invention is to provide new and useful organic phosphate ester scale inhibitors of the type described in which the amount of orthophosphate present therein is reduced to a minimum so that the effectiveness of the resultant product as a scale inhibitor in water containing hardness components is enhanced.

Another object of the invention is to provide a new and improved method for removing orthophosphate from organic phosphate ester compositions of the type described.

Still a further object of the invention is to provide a method of removing orthophosphate from organic phosphate ester compositions of the type described by a process in which an inorganic orthophosphate is precipitated in the presence of a non-solvent for the inorganic orthophosphate which is a solvent for the organic phosphate ester.

A more specific object of the invention is to provide a process for separating and recovering orthophosphate as trisodium phosphate from an organic phosphate ester reaction product derived by the reaction of polyphosphoric acid and/or phosphorous pentoxide with polyhydroxy compounds such as polyhydroxy hydrocarbons and/or hydroxyamines. Other objects will appear hereinafter.

BRIEF SUMMARY OF THE INVENTION

In accordance with the invention a reaction product comprising organic phosphate esters obtained by reacting a polyhydroxy compound from the group consisting of hydroxy hydrocarbons and/or hydroxyamines with polyphosphoric acid and/or phosphorus pentoxide, and which contains phosphorus in the form of orthophosphate, is treated with alkaline hydroxide in sufficient amount to raise the pH of the reaction product and to cause the formation of an inorganic orthophosphate, in the presence of a non-solvent for said inorganic orthophosphate, preferably a mixture of a polar solvent and water, in sufficient amount to cause precipitation of said inorganic orthophosphate, and separating the resultant precipitate so that the residual product comprises an organic phosphate ester in which the phosphate ester groups consisting essentially of one or both of a member selected from the group consisting of

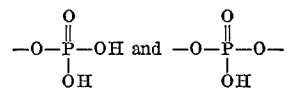

and the amount of orthophosphate in said product is eliminated or reduced to a minium.

DETAILED DESCRIPTION OF THE INVENTION

Methods of preparing organic phosphate esters by the reaction of polyphosphoric acid and/or phosphorous pentoxide and polyhydroxy compounds are fully described in U.S. Pats. 3,462,365, 3,477,956, 3,502,587, 3,557,001, U.S. applications Ser. Nos. 680,028 filed Nov. 2, 1967, 682,618 filed Nov. 13, 1967, and 8,437 filed Feb. 3, 1970.

The term "polyphosphoric acid" is defined in the Merck Index, 8th edition, and a typical analysis is 83% $P_2O_5$, which is an orthophosphoric acid equivalent of 115%. Commercially this material is known as "115% polyphosphoric acid." However, the organic phosphate esters can be made with phosphorous pentoxide or with a mixture of polyphosphoric acid and phosphorous pentoxide in various proporitons. Examples of polyhydroxy compounds which can be employed in making the organic phosphate esters are: oxyethylated glycerine containing 1.5 to 2.5 moles of ethylene oxide per mole of glycerine; oxyethylated mannitol made with 2 to 20 moles of ethylene oxide per mole of mannitol; oxyethylated sorbitol made by reacting 2 to 20 moles of ethylene oxide per mole or sorbitol; oxyethylated trimethylolpropane made with 1.5 to 2.5 moles of ethylene oxide per mole of trimethylolpropane; hydroxy hydrocarbons made by reacting other alkylene oxides, e.g., 1,2-propylene oxide and/or 1,2-propylene oxide or mixtures of these with ethylene oxide, or sequential additions of 1,2-propylene oxide and ethylene oxide in that order with polyhydroxy hydrocarbons.

The polyphosphoric acid and/or phosphorous pentoxide can also be reacted with hydroxyamines in which the hydroxyl groups of the amine are separated from a nitrogen atom of the amine by at least one carbon atom as, for example, triethanolamine, aminoethylethanolamine, diethanolamine, and oxyalkylated amines made by adding ethylene oxide, 1,2-propylene oxide, and/or 1,2-butylene oxide to amines containing reactive hydrogen atoms such as ethylenediamine, diethylene triamine, tetraethylenepentamine, and amine residues obtained as by-products in the production of polyalkylenepolyamines and polyalkanolamines. Other amines which can be oxyalkylated are dipropylenetriamine, propylenediamine, and the like.

In general, the amines will contain two or more hydroxy groups, 1 to 10 nitrogen atoms and in the case of polyamines, the nitrogen atoms will be separated by alkylene groups containing 2 to 6 carbon atoms.

The organic phosphate esters can also be derived from mixtures of hydroxy hydrocarbons and hydroxyamines and they can be mixtures of esters or mixed esters.

Ordinarily, the organic phosphate esters obtained by the reaction of polyphosphoric acid and/or phosphorous pentoxide with a polyhydroxy compound are dissolved in water and used in the form of aqueous solutions. Alcohols, such as methanol or ethanol or normal propanol, or liquid polyols such as ethylene glycol are added to these solutions in order to prevent freezing.

In the practice of the present invention the preferred procedure is to add caustic soda to an aqueous solution of the organic phosphate ester in sufficient amount to raise the pH to 10 to 13 and with further addition (if one is not already present) of a polar solvent, for example, isopropyl alcohol, ethanol, cellosolve acetate, isobutanol, or tetrahydrofuran, which is miscible with water in the proportions used but a non-solvent for trisodium phosphate which is formed as a result of the reaction between the caustic soda and orthophosphates present in the reaction product. As a result, trisodiumphosphate precipitates and can be separated from the reaction product leaving the organic phosphate esters in solution.

The trisodiumphosphate can then be sold separately and used as such or as an ingredient of other compositions, for example, as a cleaning compound. At the same time, the effectiveness of the organic phosphate ester composition as a scale inhibitor and inhibiting scale formation by hardness components in water is enhanced due to the removal of the orthophosphate component for the reasons previously explained. Since the organic phosphate scale inhibitors that are prepared by the reaction of polyphosphoric acid and polyhydroxy compounds contains anywhere from 10 to 50% orthophosphates which can precipitate in many waters as calcium phosphate, the removal of these orthophosphates is a distinct advantage.

The invention will be further illustrated but is not limited by the following examples in which the quantities are given by weight unless otherwise indicated.

EXAMPLE I 13.19 parts of 115% polyphosphoric acid was added to a reactor and heated to 50° C. to 60° C. 8.24 parts of a hydroxyamine (Amine N–4) was added slowly at a rate sufficient to maintain the temperature between 80° C. and 110° C. The final 20% of the hydroxyamine was added more rapidly and the temperature allowed to rise to 125° C.–130° C. where it was maintained for 30 minutes. The reaction mixture was then cooled below 95° C. and 14.23 parts of water and 11.98 parts of ethylene glycol were added and mixed for 15 minutes.

To the resultant solution there was then added 30.92 parts of a 50% by weight aqueous solution of sodium hydroxide (caustic soda) while cooling the mixture and controlling the rate of addition so as to maintain the temperature at 80° C.–90° C. The mixture was then cooled to reduce the reactor temperature slowly to 55° C., and it was maintained at a temperature of 50° C.–55° C. for 30 minutes while stirring. The stirring was discontinued and the mixture allowed to settle for 30 minutes. The liquid was drawn off from the top and filtered at 50° C. The precipitated solids consisting essentially of trisodium phosphate were recovered, together with the residue from the filter and the filtered liquid containing the organic phosphate ester was then neutralized with a mixture of 16.30 parts concentrated hydrochloric acid to which was added 5.14 parts of water. This product has a pH of about 8, an organic phosphate ester content of about 12% and an inorganic orthophosphate content of 1.6%.

By carrying out the process in the same manner but allowing the product to settle for a longer period of time, additional qauntities of trisodium phosphate precipitated and the inorganic orthophosphate content was reduced to 0.15%. The filtration temperatures can be somewhat lower or higher but are usually within the range of 45° C. to 55° C. The speed of trisodium phosphate precipitation can be increased by lowering the temperature.

EXAMPLE II

The procedure was the same as in Example I except that 1700 parts of 115% polyphosphoric acid were reacted with 750 parts of hydroxyamine (Amine N–4). To the reaction product there was added 250 parts of water, 1250 parts of 50% aqueous caustic soda solution and an additional 190 parts of water.

To 200 parts of the above described solution there was added 50 parts of water, 50 parts of ethylene glycol, and 160 parts of 50% aqueous caustic soda solution. 119 parts of trisodiumphosphate was precipitated and removed. To the filtrate (105 parts) containing the organic phosphate ester was added 5 parts of the tetrasodium salt of the tetraacetic acid of ethylene diamine (Versene 100) and 40 parts of concentrated hydrochloric acid. This product had a pH of 5.4, a specific gravity of 1.27, a pour point below —30° F., an organic phosphate ester content of 16.0% and an orthophosphate content of 1.0%. It was tested as a scale inhibitor and found to be satisfactory. The testing method used was that described in U.S. Pat. 3,477,956 for calcium carbonate retention and the tests were carried out at a dosage of 2 to 6 p.p.m. Complete retention was obtained at 5 and 6 p.p.m. In a standard calcium sulfate test complete retention was obtained at 0.35 and 0.4 p.p.m.

The same general procedure can be employed to remove inorganic orthophosphate from any of the other organic phosphate ester compositions previously described which contain substantial quantities of orthophosphate, thereby enhancing the effectiveness of these compositions for certain uses and at the same time producing the by-product orthophosphate which can be sold and used for other purposes. While other alkaline hydroxides can be employed, the process is normally carried out with sodium hydroxide because of its lower cost, as well as its effectiveness.

In the examples, Amine N–4 is a triethanolamine still residue similar to Amine N–1 disclosed in United States Patent 3,477,956.

The invention is hereby claimed as follows:

1. In a process of preparing organic phosphate esters by the reaction of polyphosphoric acid, phosphorous pentoxides or mixtures thereof on polyhydroxy organic compounds wherein the reaction product contains inorganic orthophosphate, the improvement which comprises adding to the reaction product caustic soda in sufficient amount to react with the inorganic orthophosphate and to raise the pH to within the range of 10 to 13 and adding an aqueous solution of a water miscible non-solvent for the resultant inorganic orthophosphate which is a solvent for said organic phosphate esters, said non-solvent being added in sufficient amount and under conditions to cause precipitation of inorganic orthophosphate, separating the precipitate, and recovering the residual organic phosphate ester reaction product in which the inorganic phosphate ester content has been reduced as compared with the initial reaction product.

2. A process as claimed in claim 1 in which the precipitation of the inorganic orthophosphate is carried out in the presence of a polar solvent and water.

3. A process as claimed in claim 2 in which the polar solvent is ethylene glycol.

4. A process as claimed in claim 1 in which the recovered organic phosphate ester reaction product contains not more than 1.6% orthophosphate.

5. A process as claimed in claim 1 in which said water miscible non-solvent is selected from the group consisting of isopropyl alcohol, ethanol, Cellosolve acetate, isobutanol and tetrahydrofuran.

References Cited

UNITED STATES PATENTS

| | | | |
|---|---|---|---|
| 3,098,072 | 7/1963 | Cherbuliez et al. | 260—978 X |
| 3,439,067 | 4/1969 | Austin et al. | 260—978 X |
| 2,854,468 | 9/1958 | Max | 260—990 |
| 2,658,909 | 11/1953 | Crandall et al. | 260—990 |

JOSEPH P. BRUST, Primary Examiner

U.S. Cl. X.R.

260—978, 980; 423—316